US011567926B2

(12) United States Patent
Balasubramanian et al.

(10) Patent No.: US 11,567,926 B2
(45) Date of Patent: Jan. 31, 2023

(54) SPURIOUS OUTLIER DETECTION SYSTEM AND METHOD

(71) Applicant: Noodle Analytics, Inc., San Francisco, CA (US)

(72) Inventors: Ravishankar Balasubramanian, Karnataka (IN); Soham Chakraborty, Karnataka (IN); Vaishakh Purohit Jagadeesh, Karnataka (IN); Muhammed Jaish Kadooran, Kerala (IN)

(73) Assignee: Noodle Analytics, Inc., San Francisco, CA (US)

( * ) Notice: Subject to any disclaimer, the term of this patent is extended or adjusted under 35 U.S.C. 154(b) by 266 days.

(21) Appl. No.: 16/887,034

(22) Filed: May 29, 2020

(65) Prior Publication Data

US 2021/0294787 A1    Sep. 23, 2021

(30) Foreign Application Priority Data

Mar. 17, 2020    (IN) .............................. 202041011488

(51) Int. Cl.
  *G06F 16/23* (2019.01)
  *G06F 17/17* (2006.01)
(52) U.S. Cl.
  CPC ........ *G06F 16/2365* (2019.01); *G06F 17/175* (2013.01)
(58) Field of Classification Search
  CPC .... G06N 5/048; G06N 7/005; G06F 16/2455; G06F 16/2365; G06F 17/175; G06F 17/18; G06Q 30/01; G06Q 30/0202; G06Q 30/0201
  See application file for complete search history.

(56) References Cited

U.S. PATENT DOCUMENTS

2008/0167837 A1* 7/2008 Basak ................ G06K 9/00503
    702/179
2008/0270088 A1* 10/2008 Abe ........................ G05B 17/02
    703/2

FOREIGN PATENT DOCUMENTS

WO    WO-2011127042 A1 * 10/2011 ........... C12Q 1/6809

OTHER PUBLICATIONS

Chen, Data Mining for the Internet of Things: Literature Review and Challenges, pp. 1-14 (Year: 2015).*

* cited by examiner

*Primary Examiner* — Albert M Phillips, III
(74) *Attorney, Agent, or Firm* — IceMiller LLP (57) ABSTRACT

A spurious outlier detection-system is provided. The system includes a memory having computer-readable instructions stored therein and a processor configured to execute the computer-readable instructions to receive time-series data from one or more sensors and/or applications, process the time-series data to detect one or more change points based on a pre-defined cost function. The processor is configured to identify data chunks between the change points using pre-determined window sizes and to estimate smooth reconstructed values (SRVs) for each of the change point data chunks between two consecutive change points to identify one or more global outliers from the SRVs. The processor is configured to determine distribution of the global outliers using kernel density for each change point data chunk and identify one or more true outliers from the distribution of the global outliers based upon a skewness of the distribution.

19 Claims, 9 Drawing Sheets

SPURIOUS OUTLIER DETECTION SYSTEM AND METHOD

PRIORITY STATEMENT

The present application hereby claims priority to Indian patent application number 202041011488 filed on Mar. 17, 2020, the entire contents of which are hereby incorporated herein by reference.

FIELD

The invention relates generally to spurious outlier detection systems, and more particularly to, techniques for detecting spurious outliers in high frequency time series data.

BACKGROUND

A variety of sensors are utilized in different environments to track and monitor operations of applications/units/devices in such environments. For example, Internet-of-Things (IoT) sensors may be used in manufacturing environments to monitor operations of equipment and/or detect any malfunction of equipment used in such environments. Typically, sensor data received from such sensors is high frequency time-series data with non-constant mean and variation.

An anomaly in IoT sensor data may be identified as an outlier and represents behaviour that deviates from normal plant or asset operations. For example, a number of sensors may be used to automate steel mills and to improve overall productivity and product quality. Outliers due to technical errors in sensor data from such environments can bring down the data quality. Typically, anomalies may be about less than 2-3% of such data. Such anomalies when correctly detected may be used as early warning systems to inform operators and maintenance technicians on equipment malfunctions & impending failure.

Contextual outliers or anomalies are especially valid for IoT data related to manufacturing where context is important to understand normal vs abnormal process behaviour. In operation, more than about 50% of these anomalies may be noisy signals that shift the scale between contextual versus spurious behaviour. Some of the current techniques to identify these outliers include broad global removal of noisy signals using simple statistical means. Such techniques are not robust and do not provide accurate detection and information about the outliers.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a spurious outlier detection system is provided. The system includes a memory having computer-readable instructions stored therein and a processor configured to execute the computer-readable instructions to receive time-series data from one or more sensors and/or applications, process the time-series data to detect one or more change points. The one or more change points are detected based on a pre-defined cost function. The processor is configured to identify data chunks between the change points using pre-determined window sizes, each change point data chunk having a plurality of change points and to estimate smooth reconstructed values (SRVs) for each of the change point data chunks between two consecutive change points to identify one or more global outliers from the SRVs. The processor is further configured to determine distribution of the global outliers using kernel density for each change point data chunk and identify one or more true outliers from the distribution of the global outliers based upon a skewness of the distribution. The one or more true outliers being representative of spurious outliers in the time-series data.

According to another example embodiment, a system is provided. The system includes one or more Internet-of-Things (IoT) sensors. The system also includes a memory having computer-readable instructions stored therein and a processor configured to execute the computer-readable instructions to access time-series data received from the one or more (IoT) sensors and to process the time-series data to detect one or more change points based upon a cost function. The processor is configured to identify one or more change point data chunks between the change points using one or more sliding windows with pre-determined window sizes, each change point data chunks having a plurality of change points and to estimate exponential weighted moving average (EWMA) for each of the change point chunks. The processor is configured to apply EWMA thresholds to each of the change point chunks to identify the one or more global outliers and to determine a distribution of the one or more global outliers using kernel density. The processor is further configured to identify one or more true outliers from the distribution of the global outliers based upon a skewness of the distribution, the one or more true outliers being representative of spurious outliers in the time-series data.

According to another example embodiment, a computer-implemented method for detecting spurious outliers in time-series data is provided. The method includes receiving time-series data from one or more sensors and/or applications and processing the time-series data to detect one or more change points. The one or more change points are detected based on a cost function. The method includes identifying one or more change point data chunks between the change points using pre-determined window sizes, each change point data chunks having a plurality of change points and estimating smooth reconstructed values (SRVs) for each of the change point data chunks between two consecutive change points to identify one or more global outliers from the SRVs. The method further includes determining a distribution of the one or more global outliers using kernel density and identifying one or more true outliers from the distribution of the global outliers based upon a skewness of the distribution, the one or more true outliers being representative of spurious outliers in the time-series data.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments are generally directed to data processing, and more particularly to, a system for spurious outlier detection for time-series data in IoT (Internet-of-Things) environments. In particular, the techniques described here facilitate detection of true outliers from time-series data such as received from IoT sensors and/or applications.

Figure 1:
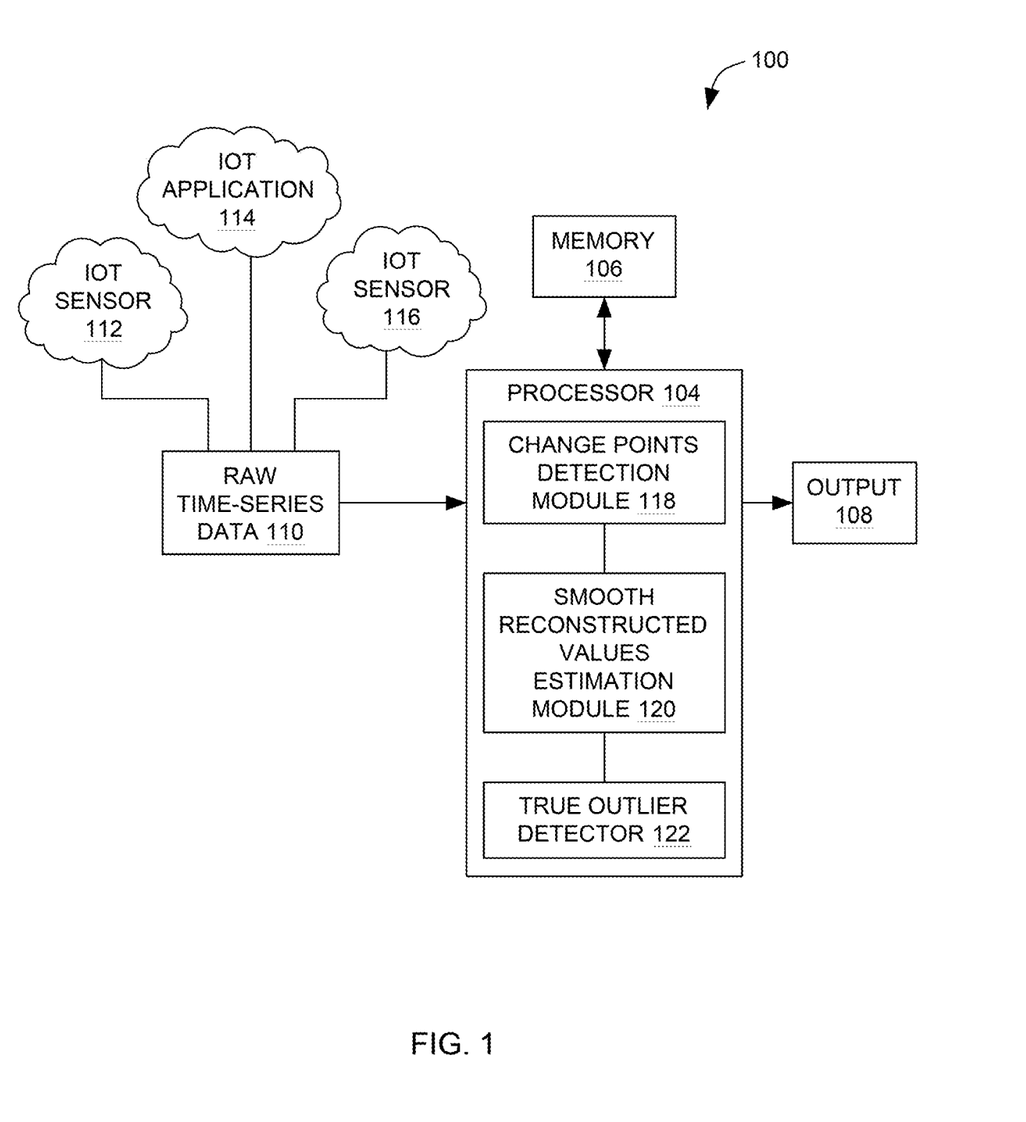
FIG. 1 illustrates a spurious outlier detection system in accordance with embodiments of the present technique.

FIG. 1 illustrates a spurious outlier detection system 100 in accordance with embodiments of the present technique. The system 100 includes a processor 104, a memory 106 and an output 108. Each component of the system 100 is described in further detail below.

In the illustrated embodiment, the processor 104 is configured to receive raw time-series data 110 from one or more sensors and/or applications. In this example, the processor 104 is configured to receive such data 110 from one or more IoT sensors and/or applications such as generally represented by reference numerals 112, 114 and 116. The processor 104 includes a change points detection module 118, a smooth reconstructed values (SRVs) estimation module 120 and a true outlier detector 122. Each of these components will be described in a greater detail.

The change points detection module 118 is configured to process the time-series data 110 to detect one or more change points based on a pre-defined cost function. In this embodiment, the cost function is a measure of the homogeneity of the time-series data 110. In one example embodiment, the cost function includes a least square deviation cost function that is estimated in accordance with the relationship:

$$C^{SE}(y(t),\theta) = \Sigma_{t \in T} \|y(t) - \hat{y}_t\|_2^2 \qquad (1)$$

Where: $C^{SE}(y(t),\theta)$ is the cost function based on the square error;
$y(t) = \{y_{t=1}, y_{t=2}, \ldots, y_{t=n}; t \in T\}$ is the n-dimensional time-series vector; and
$\bar{y}$ is the mean of $\{y(t)\}_{t \in T}$ It should be noted that a variety of other cost functions may be used for detection of the one or more change points. Examples of such cost functions include, but are not limited to, squared-error function, mean squared-error function, absolute error function, mean absolute error function, ridge cost function, root mean squared error function, or combinations thereof. Furthermore, using such cost function, an index of change points is generated.

Moreover, the change points detection module 118 utilizes window based change point detection technique to identify data chunks between the change points using pre-determined window sizes. Here, each of these data chunks includes a plurality of change points. In some examples, one or more sliding windows may be used to identify the data chunks. The window sizes is configurable and may be selected by a user of the system 100.

The SRV estimation module 120 is configured to estimate smooth reconstructed values SRVs for each of the change point data chunks between two consecutive change points to identify one or more global outliers from the SRVs. In some examples, the SRV estimation module 120 is configured to estimate SRVs for each of the change point data chunks using an auto-regressive based time-series prediction technique, exponential weighted moving average (EWMA), or combinations thereof. Other suitable techniques may be envisaged.

In one example, the SRV estimation module 120 is configured to estimate the exponential weighted moving average (EWMA) for each of the change point chunks in accordance with the relationship:

$$EWMAt = \lambda*Y_t + (1-\lambda)*EWMA(t-1) \quad t=1,2,3 \ldots n; \qquad (2)$$

Where: $Y_t$ is the observation at time t;
n is the number of observations monitored; and
$\lambda$ is a constant that determines depth of the EMWA.

In this embodiment, the SRV estimation module 120 is configured to apply EWMA thresholds to each of the change point chunks to identify the one or more global outliers, wherein the EWMA thresholds are applied in accordance with the relationship:

$$EWMA_{Thr} = EWMA0 \pm sqrt[\lambda/2 - \lambda]*\sigma \qquad (3)$$

Where: EWMA0 is the mean of original data;
$\sigma$ is the standard deviation of the original data; and
$\lambda$ is a constant that determines depth of the EMWA.

As will be appreciated by one skilled in the art, other techniques may be used to estimate the SRVs. For example, auto-regressive (AR) time series modelling may be used to estimate the SRVs. In another embodiment, Holt-Winters method may be used.

For the AR time series modelling the SRVs may be estimated in accordance with the relationship:

$$\hat{y}_t(y(t),\theta) = \mu + \theta_1 y_{t-1} + \theta_2 y_{t-2} + \ldots + \theta_{p-1} y_{t-p-1} + \theta_p y_{t-p} \qquad (4)$$

Where: $\mu$ is the rolling mean for specific windows of time;
$\theta$ is the slope coefficients or weight parameters;
p is the order;
$\hat{y}_t$ is the SRVs; and
$y(t) = \{y_{t=1}, y_{t=2}, \ldots, y_{t=n}; t \in T\}$ is the n-dimensional time-series vector.

Further, the cost function for the AR approach can be represented by the relationship:

$$C^{L2}(y(t), \theta) = \sqrt[2]{\frac{1}{n} \sum_{t \in T} \|Y(t) - \hat{y}_t\|_2^2} \qquad (5)$$

Moreover, the local outliers corresponding to each of the one or more change point data chunks are aggregated to determine the global outliers. The true outlier detector 122 is configured to determine a distribution of the global outliers using kernel density for each change point data chunk and to identify one or more true outliers from the a distribution of the global outliers. In this example, the true outlier detector 122 is configured to identify the one or more true outliers based upon a skewness of the distribution. Further, it should be noted that the true outliers are representative of spurious outliers in the time-series data. Such outliers may correspond to noise due to mechanical malfunction of a component/system, a measurement error, an experimental error, or other reasons resulting in spurious outliers.

The true outlier detector 122 is configured to determine high and low density areas of the global outliers in each data chunk using the estimated kernel density. Moreover, the true outlier detector 122 is configured to select a cut off boundary for the distribution of the global outliers based upon the skewness and to apply the cut off boundary to the distribution to identify the true outliers for each of the data chunks. The cut off boundary may be applied based on an observed sign of skewness for each of the data chunks.

Figure 2:
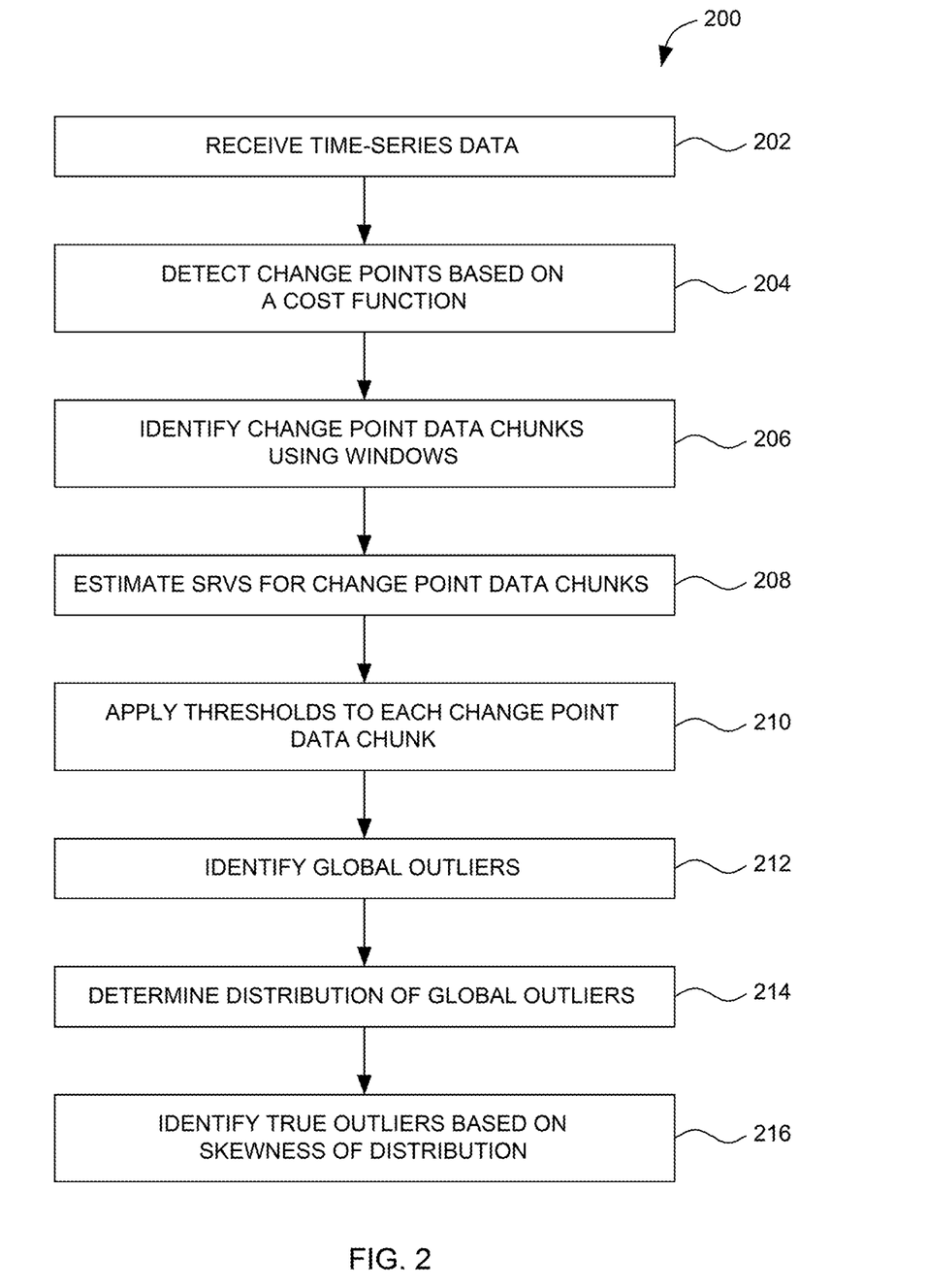
FIG. 2 is a flow diagram for illustrating a computer-implemented process for detecting spurious outliers in time-series data, using the system of FIG. 1, according to the aspects of the present technique.

FIG. 2 is a flow diagram for illustrating a computer-implemented process 200 for detecting spurious outliers in time-series data, using the system 100 of FIG. 1, according to the aspects of the present technique. At block 202, the system 100 receives the time-series data such as from IoT sensors operating in an environment. Further, the time-series data is processed to detect one or more change points (block 204). The change points are detected based on a cost function. Examples of such cost functions include, but are not limited to, squared-error function, mean squared-error function, absolute error function, mean absolute error function, ridge cost function, root mean squared error function, or combinations thereof.

At block 206, one or more change point data chunks between the change points are identified. The change point data chunks are identified using pre-determined window sizes. Each of these change point data chunks includes a number of change points. At block 208, SRVs are estimated for each change point data chunk between two consecutive change points. Further, at block 210, thresholds may be applied to each of the change point data chunks to identify one or more global outliers (block 212). The SRVs may be estimated using any suitable technique such as an auto-regressive based time-series prediction technique, exponential weighted moving average (EWMA), or combinations thereof.

At block 214, a distribution of the global outliers is determined. The distribution may be based on the kernel density. Moreover, one or more true outliers may be identified from the distribution of the global outliers based upon a skewness of the distribution (block 216). In this example, one or more high and low density areas of the one or more global outliers in each data chunk are determined using the estimated kernel density. Further, cut off boundaries are applied to the high and low density areas to identify the true outliers.

Figure 3:
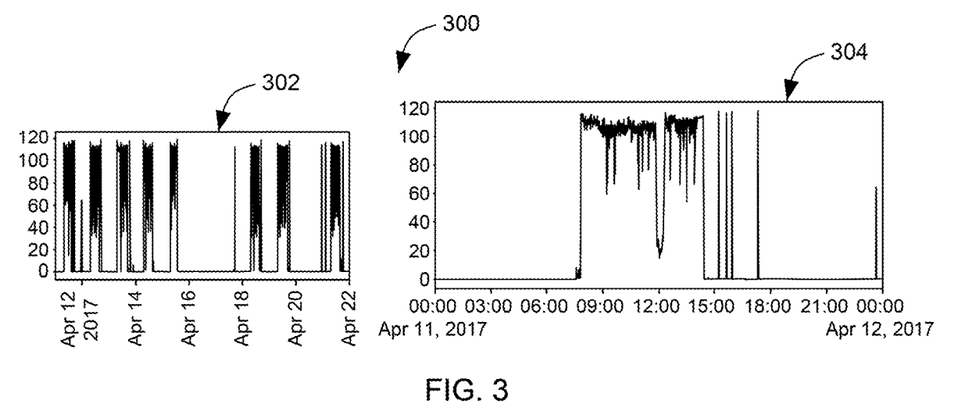
FIG. 3 is example time-series data received by the system of FIG. 1, according to the aspects of the present technique.

FIG. 3 illustrates example time-series data 300 received by the system 100 of FIG. 1, according to the aspects of the present technique. In the illustrated example, raw data received from sensors over a period of time is represented by reference numeral 302. Moreover, a zoomed version of the time-series data over a shorter period of time is represented by reference numeral 304. As illustrated, the time-series data includes multiple peaks that may be indicative of spurious outliers in the data.

Figure 4:
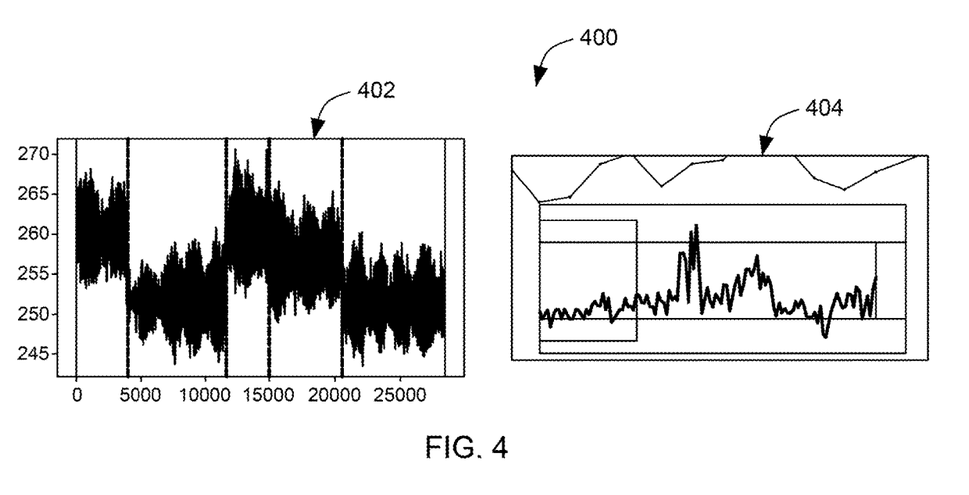
FIG. 4 illustrates detection of change points in the time-series data of FIG. 3, according to the aspects of the present technique.

FIG. 4 illustrates detection of change points 400 in the time-series data 300 of FIG., according to the aspects of the present technique. As illustrated in graphical representation 402, change points are detected and identified from the time-series data 300. In this example, the change points are detected based on a cost function. Here, least square deviation is used to identify the change points. Other suitable cost functions may be used. The graphical representation 404 illustrates identification of the change point data chunks using pre-determined window sizes. In this example, a window size of 150 has been used. The window size may be configurable by the user of the system 100. Such detection facilitates generation of an index of the change points.

Figure 5:
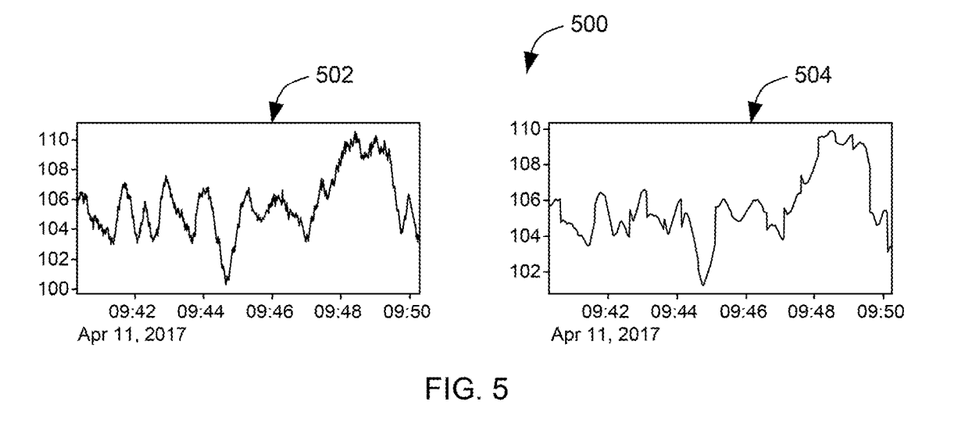
FIG. 5 illustrates estimation of smooth reconstructed values (SRVs) for a change point data chunk of FIG. 4, according to the aspects of the present technique.

FIG. 5 illustrates estimation of SRVs 500 for a change point data chunk of FIG. 4, according to the aspects of the present technique. In this example, Exponential Weighted Moving Average (EWMA) is used for smoothing of the data. The data before and after applying EWMA are represented by graphical representations 502 and 504.

Figure 6:
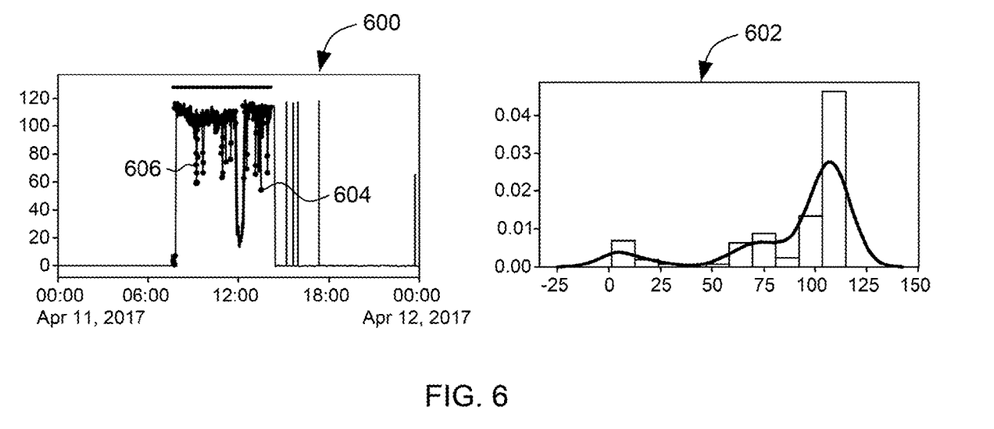
FIG. 6 illustrates global outliers detected using the smoothed data of FIG. 5, according to the aspects of the present technique.

FIG. 6 illustrates global outliers detected using the smoothed data 504 of FIG. 5, according to the aspects of the present technique. In this example, thresholds are applied to the change point data chunk of FIG. 5. In this example, EWMA thresholds are applied to the smoothed data 502 to detect the global outliers as shown in the graphical representation 600. The global outliers indicated are referenced by numerals such as 604 and 606. Moreover, the global outlier distribution is determined as shown in graphical representation 602. In this example, kernel density estimation is used to find the distribution of global outliers.

Figure 7:
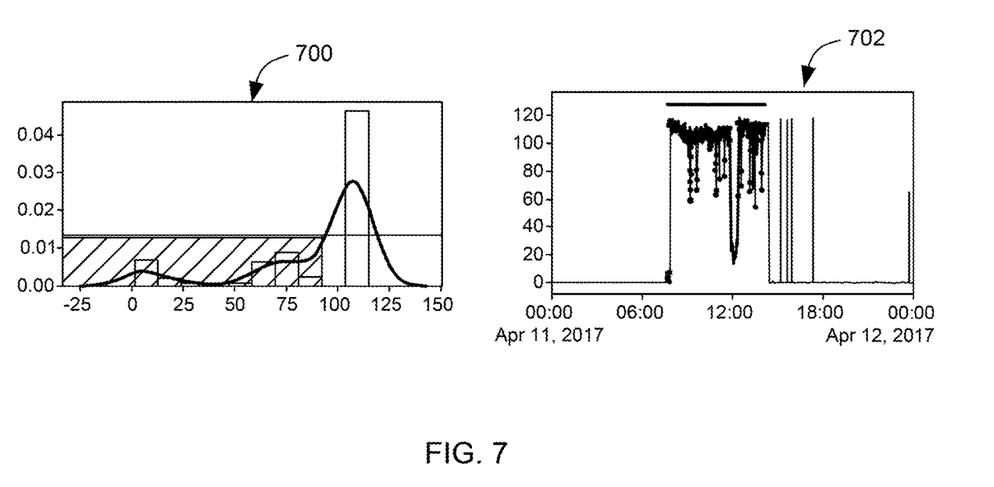
FIG. 7 illustrates true outliers identified from the global outliers detected in FIG. 6, according to the aspects of the present technique.

FIG. 7 illustrates true outliers identified from the global outliers detected in FIG. 6, according to the aspects of the present technique. In this embodiment, skewness of data is determined using the global outliers distribution 700. Further, high and low density areas were identified and based on the skewness, cut-offs were used to separate the true outliers. The detected true outliers are represented in graphical representation 702.

Figure 8:
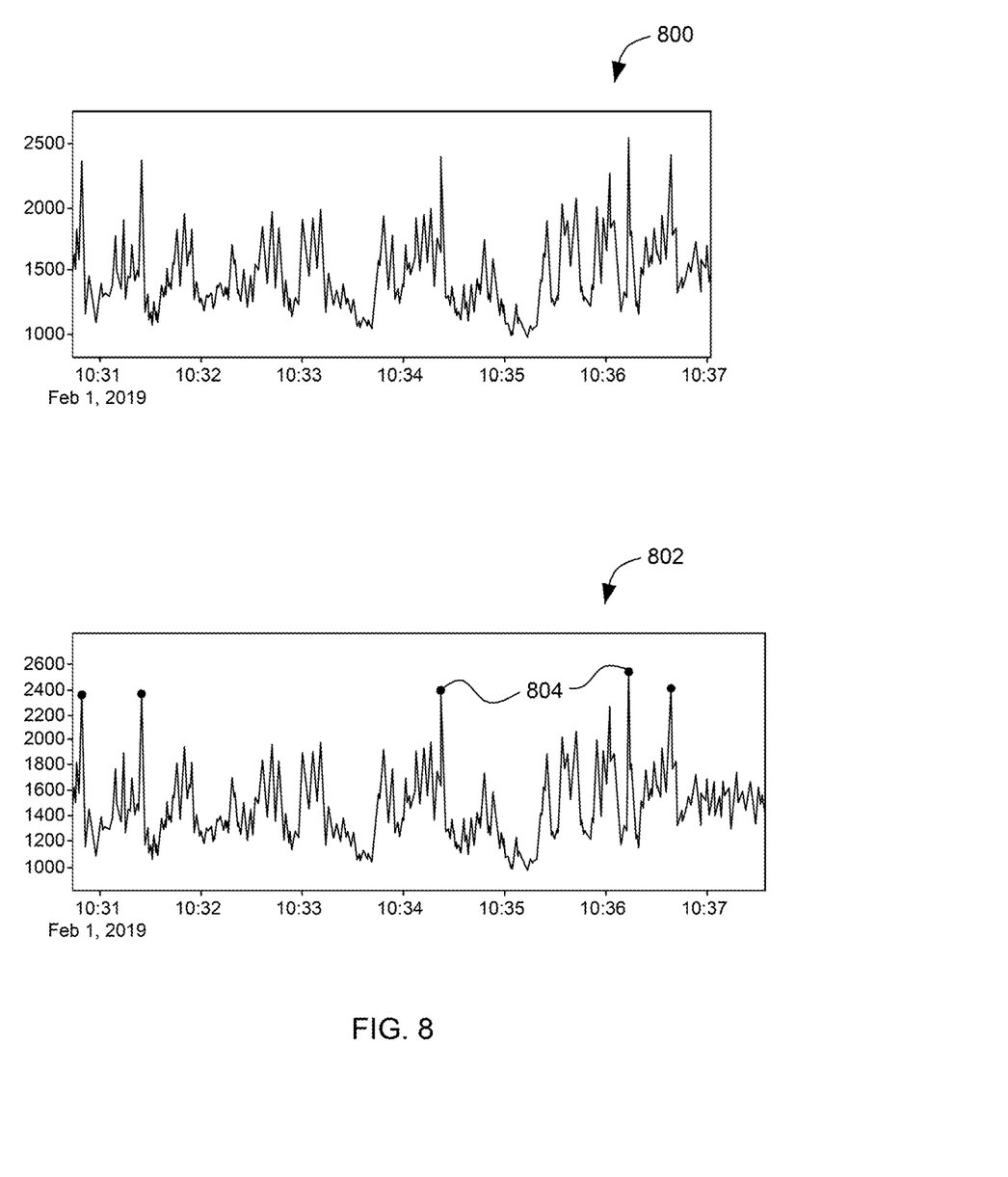
FIG. 8 illustrates raw data and corresponding true outliers detected from the data using the system 100 of FIG. 1, according to the aspects of the present technique.

FIG. 8 illustrates raw data 800 and corresponding true outliers 802 detected from the data 800 using the system 100 of FIG. 1, according to the aspects of the present technique. As can be seen, the raw sensor data 800 has multiple peaks that may be indicative of spurious outliers (noise) usually seen with IOT sensor data. In this example, the mean of the time-series data is not changing and there seems to be no visible trend in the data. As can be seen in the zoomed in plot 802, the outlier samples represented by reference numerals 804 are flagged in the peaks. Using the technique described above, all those peaks with outliers have been identified.

Figure 9:
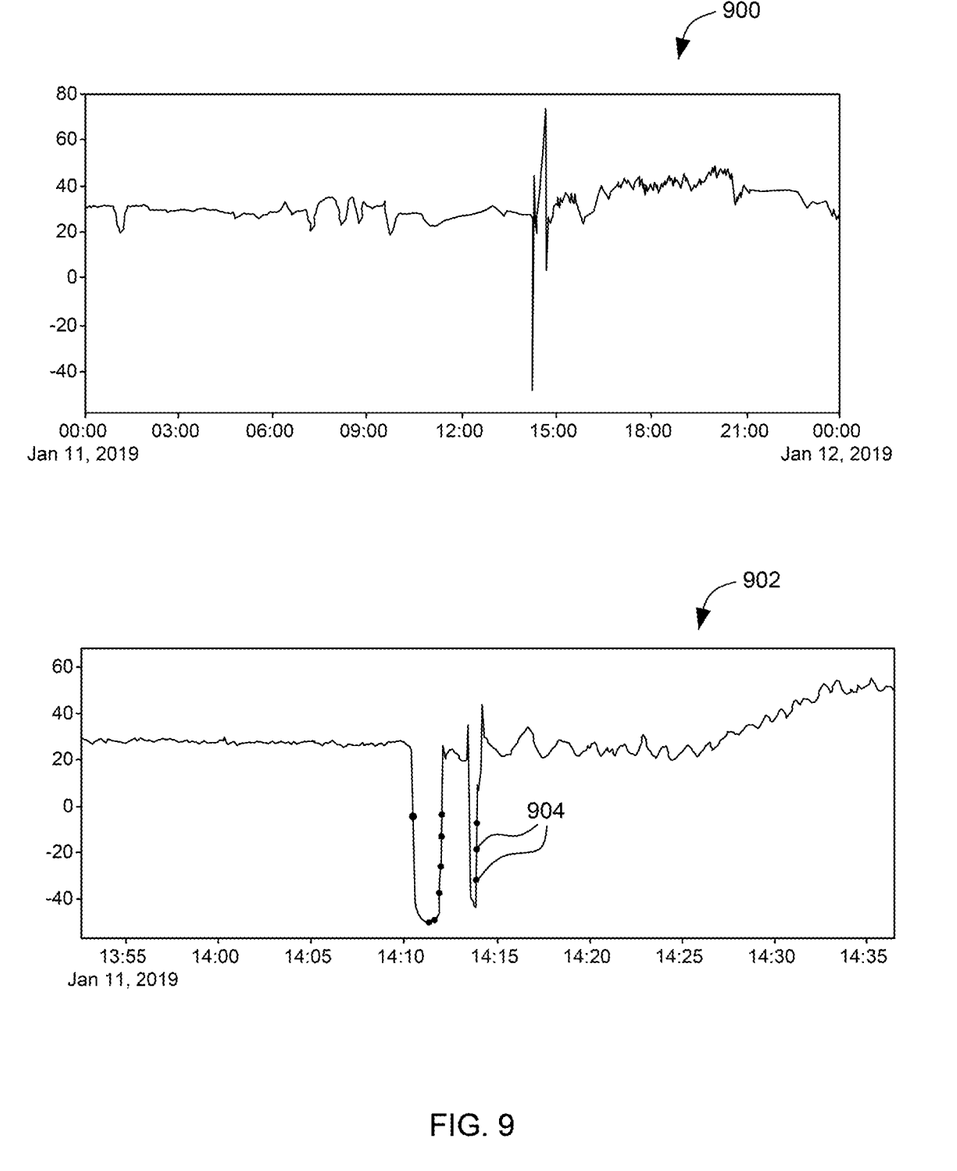
FIG. 9 illustrates another example of raw data and corresponding identified true outliers detected from the data using the system 100 of FIG. 1, according to the aspects of the present technique.

FIG. 9 illustrates another example of raw data 900 and corresponding identified true outliers 902 detected from the data 900 using the system 100 of FIG. 1, according to the aspects of the present technique. As can be seen, the raw sensor data 900 is high frequency data with visible abnormality around 1500 hours that is visibly different from the rest of the data. This is representative of sudden ambient noises in the data 900 that may or may not be due to some failure mode.

As can be seen in zoomed in plot 902 of the above with flagged outliers 904. It should be noted that the technique accurately identifies that particular zone as not being consistent with the remaining data. Here, all of the points in that zone are not flagged as the technique detects outliers within a local context as opposed to the global context.

Figure 10:
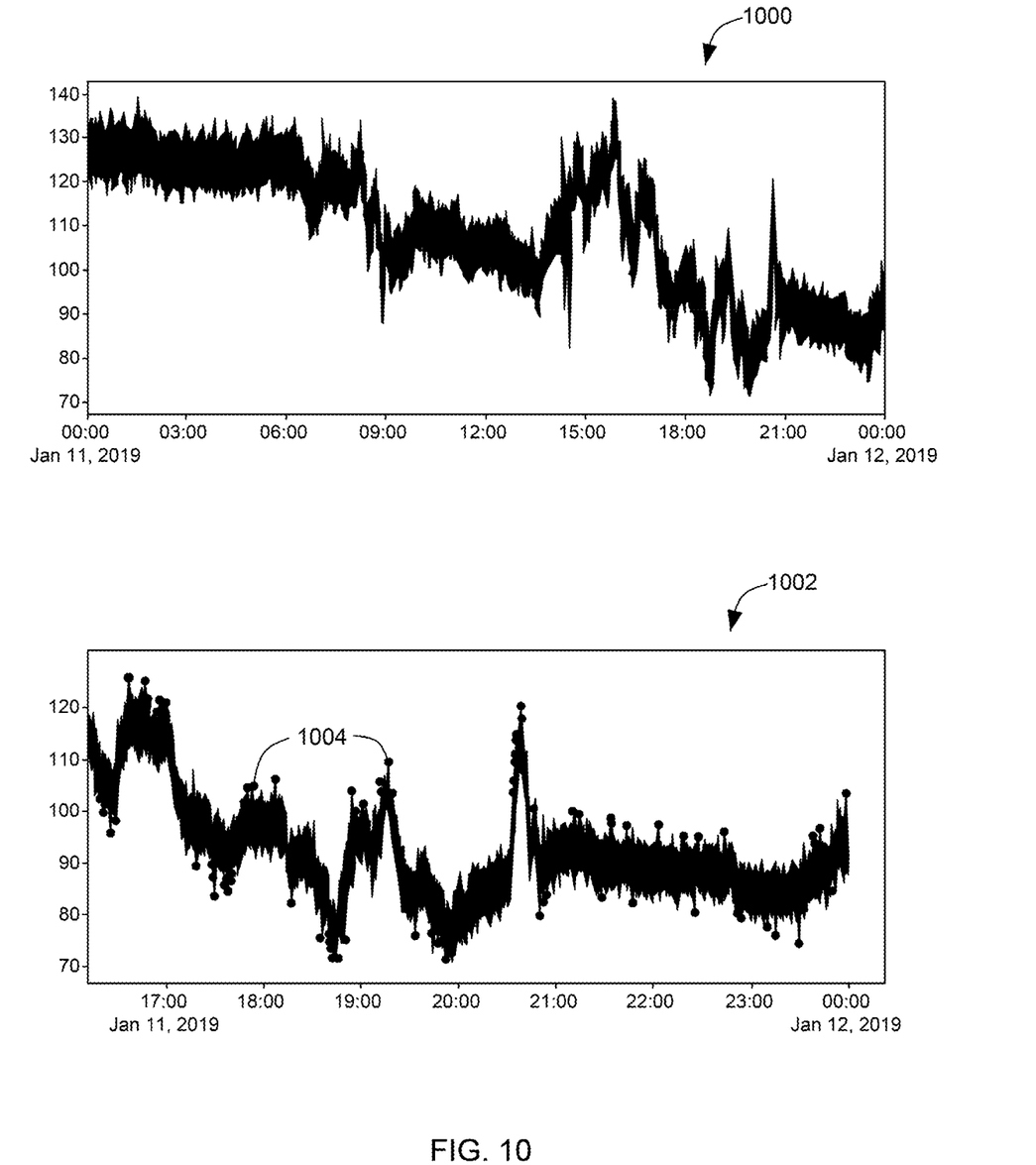
FIG. 10 illustrates another example of raw data and corresponding identified true outliers detected from the data using the system 100 of FIG. 1, according to the aspects of the present technique.

FIG. 10 illustrates another example of raw data 1000 and corresponding identified true outliers 1002 detected from the data 1000 using the system 100 of FIG. 1, according to the aspects of the present technique. As can be seen, sensor data 1000 with both the mean and variation changing over the course of a period of time (in this case a day). Typically, for such type of sensors, detecting outliers from a global context will be incorrect.

In this example, the possible spurious outliers 1004 are identified as can be seen in plot 1002. The spurious outliers are identified at a local level considering the overall trend in the data 1000. In this example, some of these flagged points may not be an outlier. These are identified using a suitable threshold/confidence coefficient.

Figure 11:
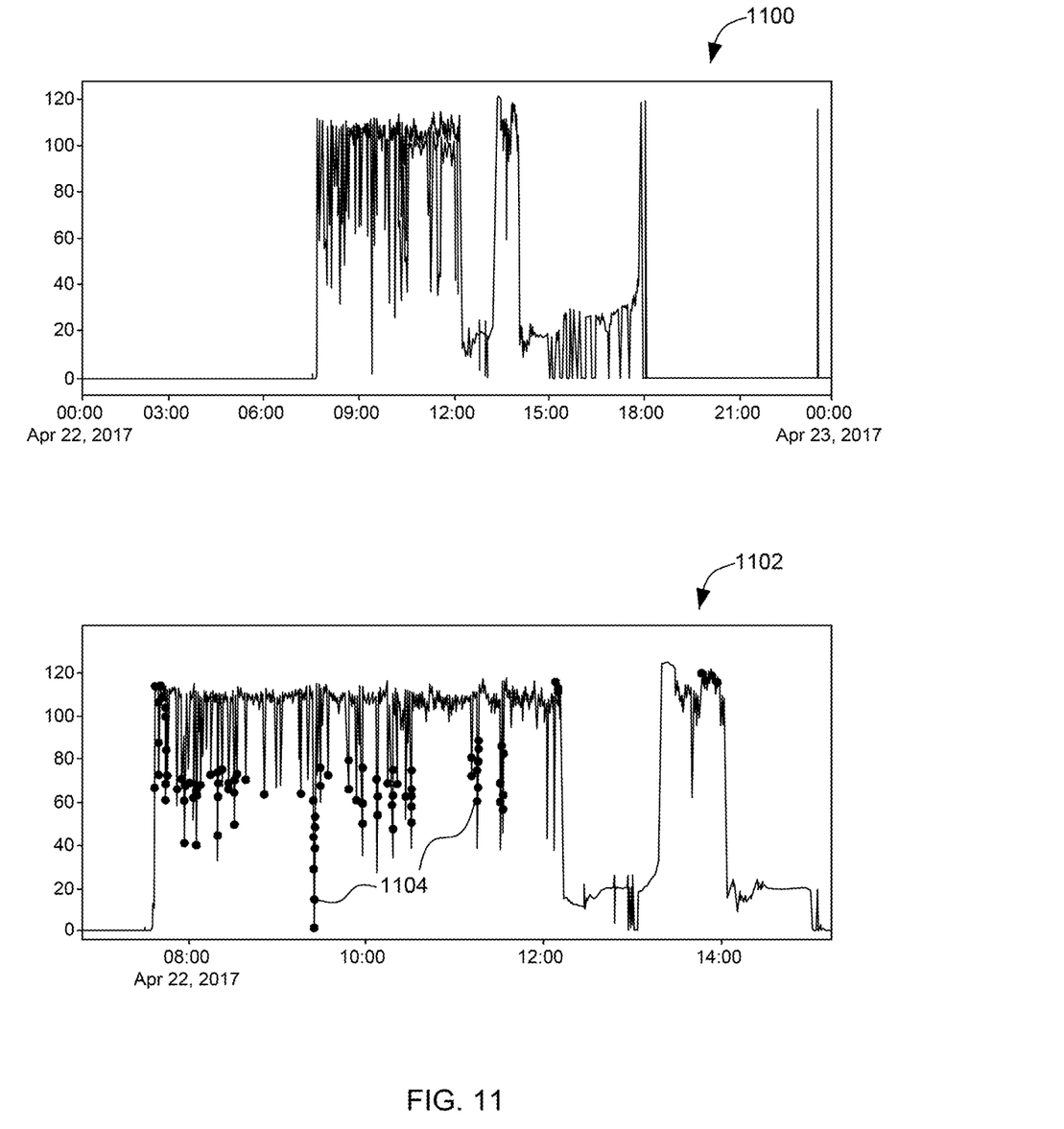
FIG. 11 illustrates another example of raw data and corresponding identified true outliers detected from the data using the system 100 of FIG. 1, according to the aspects of the present technique.

FIG. 11 illustrates another example of raw data 1100 and corresponding identified true outliers 1102 detected from the data 1100 using the system 100 of FIG. 1, according to the aspects of the present technique. In this example, sensor data with known failure is highlighted by black dashed lines (start and end). Here, as can be seen in zoomed plot 1102 most of the downward peaks are identified as outliers 1104 along with some other points but the failure zone was untouched. In this example, the searching for outliers is performed only within a local context thereby facilitating the detection in the local area.

The modules of the spurious outlier detection system 100 described herein are implemented in computing devices. One example of a computing device 1200 is described below in FIG. 12. The computing device includes one or more processor 1202, one or more computer-readable RAMs 1204 and one or more computer-readable ROMs 1206 on one or more buses 1208. Further, computing device 1200 includes a tangible storage device 1210 that may be used to execute operating systems 1220 and the spurious outlier detection system 100. The various modules of the spurious outlier detection system 100 include, a processor 104, a memory 106 and an output 108. Both, the operating system 1220 and the storage system 100 are executed by processor 1202 via one or more respective RAMs 1204 (which typically includes cache memory). The execution of the operating system 1220 and/or the system 100 by the processor 1202, configures the processor 1202 as a special purpose processor configured to carry out the functionalities of the operation system 1220 and/or the spurious outlier detection system 100, as described above.

Figure 12:
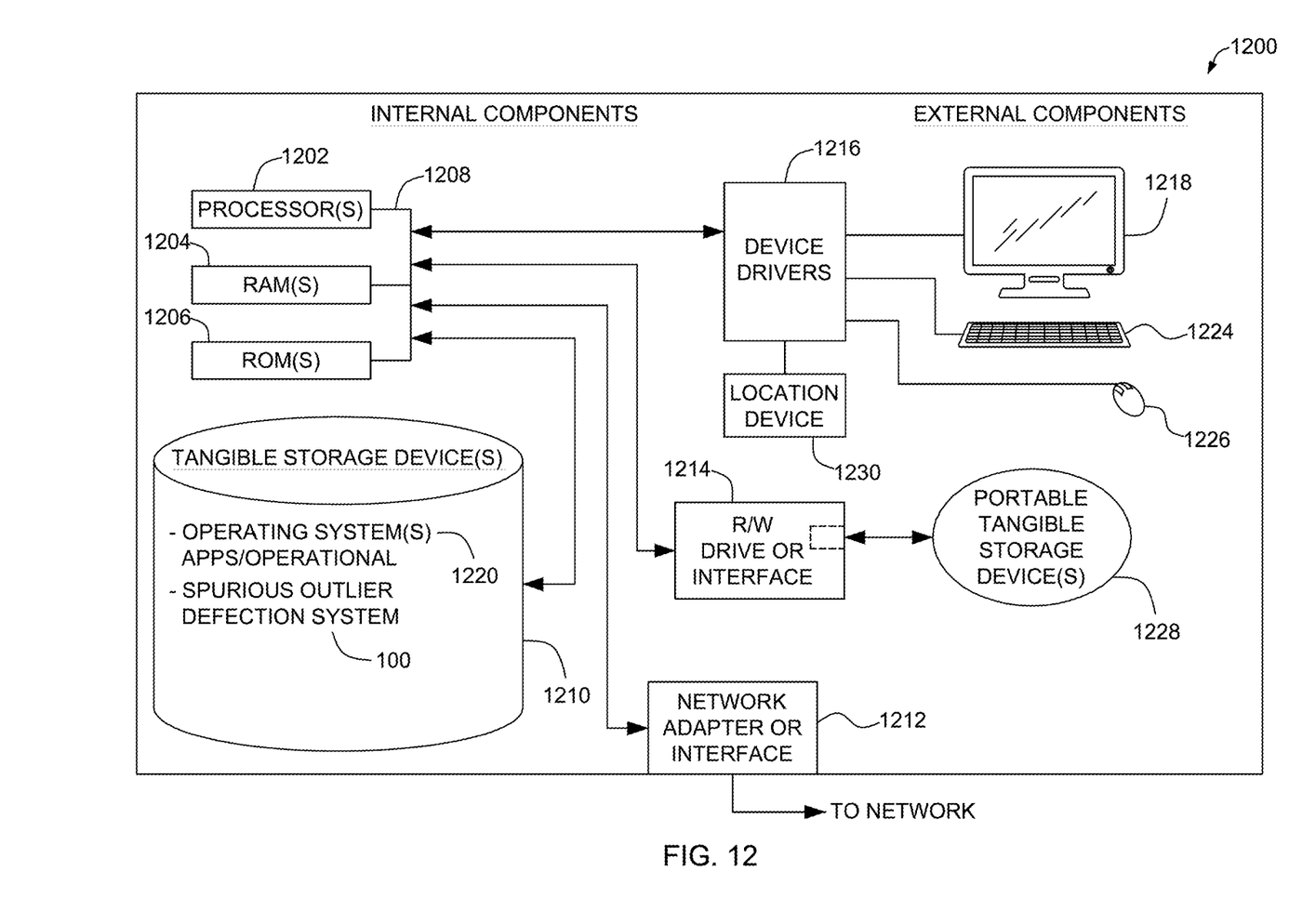
FIG. 12 is a block diagram of an embodiment of a computing device in which the modules of the spurious outlier detection system, described herein, are implemented.

Examples of storage devices 1210 include semiconductor storage devices such as ROM, EPROM, flash memory or any other computer-readable tangible storage device that may store a computer program and digital information.

Computing device also includes a R/W drive or interface 1214 to read from and write to one or more portable computer-readable tangible storage devices 1228 such as a CD-ROM, DVD, memory stick or semiconductor storage device. Further, network adapters or interfaces 1212 such as a TCP/IP adapter cards, wireless Wi-Fi interface cards, or 3G or 4G wireless interface cards or other wired or wireless communication links are also included in computing device.

In one example embodiment, the system 100 which includes a processor 104 with the change points detection module 118, the SRVs estimation module 120 and the true outlier detector 122, and memory 106, may be stored in tangible storage device 1210 and may be downloaded from an external computer via a network (for example, the Internet, a local area network or other, wide area network) and network adapter or interface 1212.

Computing device further includes device drivers 1216 to interface with input and output devices. The input and output devices may include a computer display monitor 1218, a keyboard 1224, a keypad, a touch screen, a computer mouse 1226, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A processing system comprising:
a management computer system;
one or more Internet of Things (IoT) sensors;
a memory having computer-readable instructions stored therein;
a processor ci) communicably coupled to the one or more sensors and the management computer system and (ii) configured to execute the computer-readable instructions to:
receive time-series data from the one or more sensors and/or a plurality of applications operating responsively thereto;
process the time-series data to detect one or more change points, wherein the one or more change points are detected based on a pre-defined cost function;
identify data chunks between the change points using pre-determined window sizes, each change point data chunk having a plurality of data points between two continuous time-intervals;
estimate smooth reconstructed values (SRVs) for each of the change point data chunks between two consecutive change points to identify a plurality of global outliers from the SRVs;

determine a distribution of the global outliers using kernel density for each change point data chunk, the distribution comprising one or more true outliers and at least one other type of outlier;

detect the one or more true outliers from among the distribution based upon a skewness of the distribution, the one or more true outliers being representative of spurious outliers in the time-series data; and emit an alert to the management computer system based on the one or more detections, at least one of (i) overall productivity or (ii) a quality of a product or service processed thereof being improved responsive to the management computer system receiving the alert.

2. The system of claim 1, wherein the processor is configured to execute the computer-readable instructions to estimate SRVs for each of the change point data chunks using an auto-regressive based time-series prediction technique, exponential weighted moving average (EWMA), or combinations thereof.

3. The system of claim 2, wherein the processor is configured to execute the computer-readable instructions to estimate the cost function for identifying change points in accordance with the relationship:

$$C^{SE}(y(t), \theta) = \sum_{t \in T} \|y(t) - \hat{y}_t\|_2^2$$

Where: $C^{SE}(y(t), \theta)$ is the cost function based on the square error;

$y(t)=\{y_{t=1}, y_{t=2}, \ldots, y_{t=n}; t \in T\}$ is the n-dimensional time-series vector; and $\bar{y}$ is the mean of $\{y(t)\} t \in T$.

4. The system of claim 2, wherein the processor is configured to execute the computer-readable instructions to estimate the exponential weighted moving average (EWMA) for each of the change point chunks in accordance with the relationship:

EWMA$t=\lambda *Y_t+(1-\lambda)*$EWMA$(t-1)$ $t=1,2,3 \ldots n;$

Where: $Y_t$ is the observation at time t n is the number of observations monitored; and $\lambda$ is a constant that determines depth of the EMWA.

5. The system of claim 4, wherein the processor is configured to execute the computer-readable instructions to apply EWMA thresholds to each of the change point chunks to identify the one or more global outliers, wherein the EWMA thresholds are applied in accordance with the relationship:

$$EWMA_{Thr} = EWMA0 \pm sqrt[\lambda/2 - \lambda]*\sigma$$

Where: EWMA0 is the mean of original data;

$\sigma$ is the standard deviation of the original data; and $\lambda$ is a constant that determines depth of the EMWA.

6. The system of claim 1, wherein the processor is configured to execute the computer-readable instructions to aggregate local outliers corresponding to each of the one or more change point data chunks to determine the global outliers.

7. The system of claim 1, wherein the processor is configured to execute the computer-readable instructions to determine high- and low-density areas of the global outliers in each data chunk using the estimated kernel density.

8. The system of claim 1, wherein the processor is configured to execute the computer-readable instructions to:

select a cut off boundary for the distribution of the global outliers based upon the skewness; and apply the cut off boundary to the distribution to identify the true outliers for each of the data chunks.

9. The system of claim 8, wherein the processor is further configured to execute the computer-readable instructions to apply the cut off boundary based on an observed sign of skewness for each of the data chunks.

10. The system of claim 1, wherein the one or more true outliers correspond to noise due to mechanical malfunction of a component/system, a measurement error, an experimental error, or combinations thereof.

11. A system, comprising:

a management computer system;

one or more Internet-of-Thing (IoT) sensors;

a memory having computer-readable instructions stored therein;

a processor (i) communicatively coupled to the one or more sensors and the management computer system and (ii) configured to execute the computer-readable instructions to:

access time-series data received from the one or more (IoT) sensors;

process the time-series data to detect one or more change points based upon a cost function;

identify one or more change point data chunks between the change points using one or more sliding windows with pre-determined window sizes, each of the change point data chunks having a plurality of data points between two continuous time-intervals;

estimate exponential weighted moving average (EWMA) for each of the change point chunks;

apply EWMA thresholds to each of the change point chunks to identify a plurality of global outliers;

determine a distribution of the global outliers using kernel density, the distribution comprising one or more true outliers and at least one other type of outlier;

detect the one or more true outliers from among the distribution based upon a skewness of the distribution, the one or more true outliers being representative of spurious outliers in the time-series data; and emit an alert to the management computer system based on the one or more detections, at least one of (i) overall productivity or (ii) a quality of a product or service processed thereof being improved responsive to the management computer system receiving the alert.

12. The system of claim 11, wherein the processor is further configured to execute the computer-readable instructions to detect the one or more change points based on a least-square deviation cost function, a regime shift index cost function, absolute deviation cost function, or combinations thereof.

13. The system of claim 11, wherein the processor is configured to execute the computer-readable instructions to estimate the exponential weighted moving average (EWMA) for each of the change point chunks in accordance with the relationship:

EWMA$t=\lambda *Y_t+(1-\lambda)*$EWMA$(t-1)$ $t=1,2,3 \ldots n;$

Where: $Y_t$ is the observation at time t n is the number of observations monitored; and $\lambda$ is a constant that determines depth of the EMWA.

14. The system of claim 13, wherein the processor is configured to execute the computer-readable instructions to apply EWMA thresholds to each of the change point chunks to identify the one or more global outliers, wherein the EWMA thresholds are applied in accordance with the relationship:

$$EWMA_{Thr} = EWMA0 \pm sqrt[\lambda/2 - \lambda] * \sigma$$

Where: EWMA0 is the mean of original data;
$\sigma$ is the standard deviation of the original data; and
$\lambda$ is a constant that determines depth of the EMWA.

15. The system of claim 11, wherein the processor is configured to execute the computer-readable instructions to aggregate local outliers corresponding to each of the one or more change point data chunks to determine the global outliers.

16. A computer-implemented method for detecting spurious outliers in time-series data, the method comprising:
providing a management computer system;
providing a processor communicably coupled to one or more IoT sensors and the management computer system;
receiving time-series data from the one or more sensors and/or applications operating responsively thereto;
processing the time-series data to detect one or more change points, wherein the one or more change points are detected based on a cost function;
identifying one or more change point data chunks between the change points using pre-determined window sizes, each of the change point data chunks having a plurality of data points between two continuous time-intervals;
estimating smooth reconstructed values (SRVs) for each of the change point data chunks between two consecutive change points to identify a plurality of global outliers from the SRVs;
determining a distribution of the a plurality of global outliers using kernel density, the distribution comprising one or more true outliers and at least one other type of outlier;
detecting the one or more true outliers from among the distribution based upon a skewness of the distribution, the one or more true outliers being representative of spurious outliers in the time-series data; and
alerting the management computer system based on the one or more detections, at least one of (i) overall productivity or (ii) a quality of a product or service processed thereof being improved responsive to the management computer system receiving the alert.

17. The computer implemented method of claim 16, further comprising applying thresholds to each of the change point chunks to identify the one or more global outliers.

18. The computer implemented method of claim 16, further comprising aggregating local outliers corresponding to each of the one or more change point data chunks to determine the global outliers.

19. The computer implemented method of claim 16, further comprising:
determining one or more high- and low-density areas of the one or more global outliers in each data chunk using the estimated kernel density; and
applying cut off boundaries to the high- and low-density areas of the one or more global outliers to identify the true outliers.

* * * * *